US011625150B2

(12) United States Patent
Narayanan et al.

(10) Patent No.: US 11,625,150 B2
(45) Date of Patent: Apr. 11, 2023

(54) ADAPTING ORDER OF MENU, SUBMENUS AND CARDS IN USER INTERFACE BASED ON PARTICULAR CUSTOMER USAGE

(71) Applicant: ARRIS Enterprises LLC, Suwanee, GA (US)

(72) Inventors: Muralidharan Narayanan, Bangalore (IN); Jalagandeswari Ganapathy, Bangalore (IN)

(73) Assignee: ARRIS ENTERPRISES LLC, Suwanee, GA (US)

( * ) Notice: Subject to any disclaimer, the term of this patent is extended or adjusted under 35 U.S.C. 154(b) by 0 days.

(21) Appl. No.: 17/399,441

(22) Filed: Aug. 11, 2021

(65) Prior Publication Data

US 2022/0075490 A1    Mar. 10, 2022

Related U.S. Application Data

(60) Provisional application No. 63/074,753, filed on Sep. 4, 2020.

(51) Int. Cl.
*G06F 3/048* (2013.01)
*G06F 3/0482* (2013.01)
*G06F 9/451* (2018.01)

(52) U.S. Cl.
CPC ............ *G06F 3/0482* (2013.01); *G06F 9/451* (2018.02)

(58) Field of Classification Search
None
See application file for complete search history.

(56) References Cited

U.S. PATENT DOCUMENTS

| | | | | |
|---|---|---|---|---|
| 5,510,979 A | * | 4/1996 | Moderi | G06Q 20/202 |
| | | | | 235/377 |
| 5,806,071 A | * | 9/1998 | Balderrama | G06Q 10/087 |
| 6,892,183 B1 | * | 5/2005 | Cooper | A47F 9/046 |
| | | | | 186/61 |
| 7,246,329 B1 | * | 7/2007 | Miura | G06F 3/0482 |
| | | | | 715/764 |
| 10,908,811 B1 | * | 2/2021 | Sethi | G06F 3/04883 |
| 2005/0149551 A1 | * | 7/2005 | Fong | G06F 3/0482 |
| 2007/0044029 A1 | * | 2/2007 | Fisher | G06F 9/451 |
| | | | | 715/762 |
| 2008/0005700 A1 | * | 1/2008 | Morikawa | G06F 3/0482 |
| | | | | 715/841 |
| 2018/0203575 A1 | * | 7/2018 | Kwon | H04N 21/485 |

* cited by examiner

*Primary Examiner* — Thanh T Vu

(74) *Attorney, Agent, or Firm* — Wenderoth, Lind & Ponack, L.L.P.

(57) ABSTRACT

A electronic device may generate graphic user interface (GUI) data, based on menu data, for display as a GUI on a display device. The GUI including a plurality of user-selectable menu items configured in a first order, will update the menu data in response to a selection, by the user, of one of the plurality of user-selectable menu items. The GUI data is then updated for display as an updated GUI on the display device wherein the menu data include plurality of menu item counters corresponding to the plurality of user-selectable menu items, respectively. The updated GUI data is updated for display as the updated GUI on the display device by arranging the plurality of the user-selectable menu items in a second order based on values of the menu item counter.

15 Claims, 13 Drawing Sheets

|       | Menu Item | Counter | Font Size | Font Color | Location |
|-------|-----------|---------|-----------|------------|----------|
| 512   | ANST-0    | 0       | 12        | Black      | H1 V1    |
| 514   | SDHT-0    | 0       | 12        | Black      | H1 V2    |
| 516   | GASL-0    | 0       | 12        | Black      | H1 V3    |
| 518   | CBDV-0    | 0       | 12        | Black      | H1 V4    |
| 520   | SETT-0    | 0       | 12        | Black      | H1 V5    |

Columns: 502, 504, 506, 508, 510. Table 500.

FIG. 5A

|     | Menu Item | Counter | Font Size | Font Color | Location |
| --- | --- | --- | --- | --- | --- |
| 512 | ANST-0 | 0 | 12 | Black | H1 V1 |
| 514 | SDHT-0 | 0 | 12 | Black | H1 V2 |
| 516 | GASL-0 | 1 | 12 | Black | H1 V3 |
| 518 | CBDV-0 | 0 | 12 | Black | H1 V4 |
| 520 | SETT-0 | 0 | 12 | Black | H1 V5 |

FIG. 5B

| Menu Item | Counter | Font Size | Font Color | Location |
|---|---|---|---|---|
| ANST-3 | 3 | 11 | Black | H1 V3 |
| SDHT-1 | 1 | 11 | Black | H1 V4 |
| GASL-5 | 5 | 11 | Black | H1 V2 |
| CBDV-0 | 0 | 11 | Black | H1 V5 |
| SETT-8 | 8 | 13 | Blue | H1 V1 |

FIG. 5C

| Menu Item | Counter | Font Size | Font Color | Location |
|---|---|---|---|---|
| ANST-SN-0 | 0 | 12 | Black | H1 V1 |
| ANST-SD-0 | 0 | 12 | Black | H1 V2 |
| ANST-SL-0 | 0 | 12 | Black | H1 V3 |
| ANST-SC-0 | 0 | 12 | Black | H1 V4 |

FIG. 7A

|     | Menu Item 702 | Counter 704 | Font Size 706 | Font Color 708 | Location 710 |
| --- | --- | --- | --- | --- | --- |
| 712 | ANST-SN-0 | 0 | 12 | Black | H1 V1 |
| 714 | ANST-SD-0 | 1 | 12 | Black | H1 V2 |
| 716 | ANST-SL-0 | 0 | 12 | Black | H1 V3 |
| 718 | ANST-SC-0 | 0 | 12 | Black | H1 V4 |

| Menu Item | Counter | Font Size | Font Color | Location |
|---|---|---|---|---|
| ANST-SN-3 | 3 | 11 | Black | H1 V2 |
| ANST-SD-4 | 4 | 13 | Blue | H1 V1 |
| ANST-SL-0 | 0 | 11 | Black | H1 V4 |
| ANST-SC-1 | 1 | 11 | Black | H1 V3 |

FIG. 7C

ADAPTING ORDER OF MENU, SUBMENUS AND CARDS IN USER INTERFACE BASED ON PARTICULAR CUSTOMER USAGE

BACKGROUND

Embodiments of the invention generally relate to managing graphic user interface menus.

SUMMARY

Aspects of the present disclosure are drawn to an electronic device for use with a display device and by a user. The electronic device includes a memory having menu data stored therein, and a processor configured to execute the instructions stored on the memory. The electronic device will generate graphic user interface (GUI) data, based on the menu data, for display as a GUI on the display device. The GUI including a plurality of user-selectable menu items configured in a first order, will update the menu data in response to a selection, by the user, of one of the plurality of user-selectable menu items. The GUI data is then updated for display as an updated GUI on the display device wherein the menu data include plurality of menu item counters corresponding to the plurality of user-selectable menu items, respectively. The updated GUI data is updated for display as the updated GUI on the display device by arranging the plurality of the user-selectable menu items in a second order based on values of the menu item counter.

In some embodiments, the processor is further configured to execute instructions stored on the memory to additionally cause the electronic device to generate the GUI data such that one of the plurality of user-selectable menu items includes a plurality of user-selectable sub menu items configured in a first sub menu order. The menu data includes a plurality of sub menu item counters corresponding to the plurality of user-selectable sub menu items, respectively. The menu data is updated in response to a selection, by the user, of one of the plurality of user-selectable sub menu items, so as to increase a sub menu item counter corresponding to the one of the plurality of user-selectable sub menu items. The updated GUI data is updated for display as the updated GUI on the display device by additionally arranging the plurality of user-selectable sub menu items in a second sub menu order based on values of the sub menu item counter.

In some embodiments, the processor is further configured to execute instructions stored on the memory to additionally cause the electronic device to generate the GUI data, based on the menu data, for display as a GUI menu selected from the group of types of GUI menus. This consists of a card menu, a horizontal menu, a hamburger menu, a mega menu, a scroll triggered menu, a vertical slidebar menu, a hover trigger menu, a sticky menu and a fixed menu.

In some embodiments, the electronic device further wherein the menu data includes, for each of the plurality of user-selectable menu items, a respective plurality of attributes wherein a respective menu item counter is included as of an attribute within each of the respective plurality of attributes.

In some embodiments, the processor is further configured to execute instructions stored on the memory to additionally cause the electronic device to transmit the GUI data and the updated GUI data to an external server. The memory will additionally cause the electronic device to receive the GUI data and the updated GUI data from the external server.

Other aspects of the present disclosure are drawn to a method of using an electronic device with a display device and by a user, the method includes generating, via a processor configured to execute instructions stored on a memory additionally having menu data stored therein, graphic user interface (GUI) data, based on the menu data, for display as a GUI on the display device, the GUI including a plurality of user-selectable menu items configured in a first order. The method also includes updating, via the processor, the menu data in response to a selection, by the user, of one of the plurality of user-selectable menu items. The method further includes updating, via the processor, the GUI data for display as an updated GUI on the display device, wherein the menu data includes a plurality of menu item counters corresponding to the plurality of user-selectable menu items, respectively. The menu data is updated in response to the selection, by the user, of one of the plurality of user-selectable menu items, so as to increase a menu item counter corresponding to the one of the plurality of user-selectable menu items. The updated GUI data is updated for display as the updated GUI on the display device by arranging the plurality of user-selectable menu items in a second order based on values of the menu item counter.

In some embodiments, the method further includes generating, via the processor, the GUI data such that the one of the plurality of user-selectable menu items includes a plurality of user-selectable sub menu items configured in a first sub menu order. The menu data includes a plurality of sub menu item counters corresponding to the plurality of user-selectable sub menu items, respectively. The menu data is updated in response to a selection, by the user, of one of the plurality of user-selectable sub menu items, so as to increase a sub menu item counter corresponding to the one of the plurality of user-selectable sub menu items. The updated GUI data is updated for display as the updated GUI on the display device by additionally arranging the plurality of user-selectable sub menu items in a second sub menu order based on values of the sub menu item counter.

In some embodiments, the method wherein the generating the GUI data, based on the menu data, for display as a GUI menu includes generating the GUI menu selected from the group of types of GUI menus consisting of a card menu, a horizontal menu, a hamburger menu, a mega menu, a scroll triggered menu, a vertical slide bar menu, a hover trigger menu, a sticky menu and a fixed menu.

In some embodiments, the method wherein the menu data includes, for each of the plurality of user-selectable menu items, a respective plurality of attributes wherein a respective menu item counter is included as of an attribute within each of the respective plurality of attributes.

In some embodiments, the method further including transmitting, via the processor, the GUI data ant eh updated GUI data to an external server. The method includes receiving, via the processor, the GUI data and the updated GUI from the external sever.

Other aspects of the present disclosure are drawn to a non-transitory, computer-readable media having computer-readable instructions stored thereon, the computer-readable instructions being capable of being read by an electronic device for use with a display device and by a user. The computer-readable instructions are capable of instructing the server device to perform the method including generating, via a processor configured to execute instructions stored on a memory additionally having menu data stored therein, graphic user interface (GUI) data, based on the menu data, for display as a GUI on the display device, the GUI including a plurality of user-selectable menu items configured in a first order. The method further includes updating, via the processor, the menu data in response to a selection, by the user, of one of the plurality of user-selectable menu items. The method also includes updating, via the processor, the GUI data for display as an updated GUI on the display device. The menu data includes a plurality of menu item counters corresponding to the plurality of user-selectable menu items, respectively. The menu data is updated in response to the selection, by the user, of the one of the plurality of user-selectable menu items, so as to increase a menu item counter corresponding to the one of the plurality of user-selectable menu items. The updated GUI data is updated for display as the updated GUI on the display device by arranging the plurality of user-selectable menu items in a second order based on values of the menu item counter.

In some embodiments, the non-transitory, computer-readable media includes the computer-readable instructions are capable of instructing the electronic device to perform the method. The method includes generating, via the processor, the GUI data such that the one of the plurality of user-selectable menu items includes a plurality of user-selectable sub menu items configured in a first sub menu order. The menu data includes a plurality of sub menu item counters corresponding to the plurality of user-selectable sub menu items, respectively. The menu data is updated in response to a selection, by the user, of one of the plurality of user-selectable sub menu items, so as to increase a sub menu item counter corresponding to the one of the plurality of user-selectable sub menu items. The updated GUI data is updated for display as the updated GUI on the display device by additionally arranging the plurality of user-selectable sub menu items in a second sub menu order based on values of the sub menu item counter.

In some embodiments, the non-transitory, computer-readable media includes the computer-readable instructions are capable of instructing the server device to perform the method wherein the generating the GUI data, based on the menu data, for display as a GUI menu includes generating the GUI menu selected from the group of types of GUI menus consisting of a card menu, a horizontal menu, a hamburger menu, a mega menu, a scroll triggered menu, a vertical slide bar menu, a hover trigger menu, a sticky menu and a fixed menu.

In some embodiments, the non-transitory, computer-readable media includes the computer-readable instructions are capable of instructing the electronic device to perform the method wherein the menu data includes, for each of the plurality of user-selectable menu items, a respective plurality of attributes. A respective menu item counter is included as of an attribute within each of the respective plurality of attributes.

In some embodiments, the non-transitory, computer-readable media includes the computer-readable instructions are capable of instructing the electronic device to perform the method further including transmitting, via the processor, the GUI data and the updated GUI data to an external server. The method additionally including receiving, via the processor, the GUI data and the updated GUI data from the external server.

BRIEF SUMMARY OF THE DRAWINGS

The accompanying drawings, which are incorporated in and form a part of the specification, illustrate example embodiments and, together with the description, serve to explain the principles of the invention. In the drawings:

FIG. 5A illustrates a non-limiting example of a lookup table (LUT) at time $t_0$, in accordance with aspects of the present disclosure;

FIG. 5B illustrates the LUT of FIG. 5A at time $t_1$, in accordance with aspects of the present disclosure;

FIG. 5C illustrates the LUT of FIG. 5A at time $t_2$, in accordance with aspects of the present disclosure;

FIG. 7A illustrates a non-limiting example of an LUT at time $t_3$ in accordance with aspects of the present disclosure;

FIG. 7B illustrates the LUT of FIG. 7A at time $t_4$, in accordance with aspects of the present disclosure; and FIG. 7C illustrates the LUT 700 at time $t_5$ in accordance with aspects of the present disclosure.

DETAILED DESCRIPTION

Figure 1:
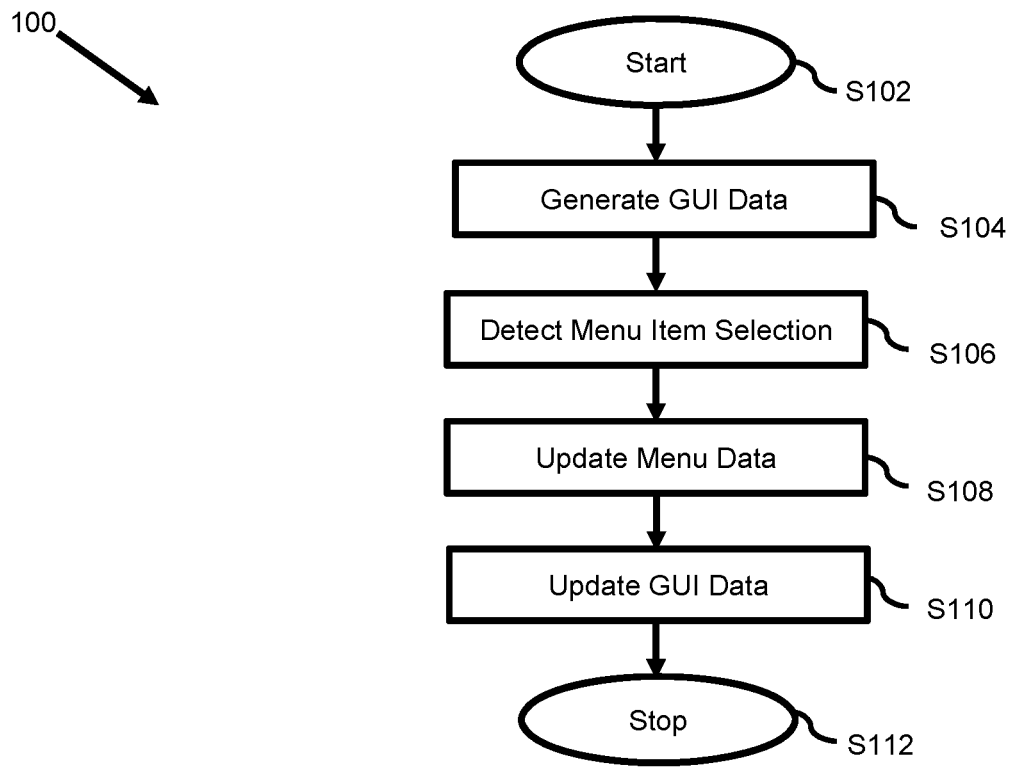
FIG. 1 illustrates an example algorithm to be executed by a processor for automatically rearranging user-selectable menu items on a GUI menu, in accordance with aspects of the present disclosure.

Aspects of the present disclosure play a vital role in onboarding and managing a router in the customer premises of the user. The client device is essentially used as a single point of control for the features supported by a router with 4×4 802.11ax Wi-Fi 6 mesh network technology.

One of the important parts of UI design in any client device is about creating and providing meaningful menus, submenus and cards to direct the user to their desired page in the client device and then complete their action. If the menus, submenus, and cards are not meaningfully named, the users may end up picking the items that are not suitable for their actions. This will have negative effects on users and may lose users' interest and their first impression of using the client device. Hence, choosing meaningful names for the menus, submenus and titles for the cards is one important item. Another critical element in the UI design is the ability to quickly lead user to and prompt the desired item (which can be a user-selectable menu item, user-selectable submenu item or a digital card display) to the user in the client device.

In a client device UI design, menus and submenus have always dominated as the most important start point for maneuvering the device. Menus and submenus are available in various forms out of which the top commonly used ones include: a card menu, a horizontal menu, hamburger menu, mega menu, scroll triggered menu, vertical sidebar menu, hover triggered menu, and lastly sticky or fixed menu.

Another important UI design item frequently used is the representation in form of digital cards. Cards are little rectangles with images, text and specialized background colors or patterns that serve as entry points to more detailed information. Digital cards are useful in UI design because they are straightforward analogs to real-world cards.

Using cards has many advantages including the ability to display heterogenous content from varying sources such as network related information which can include router information and parental control features for example. Another advantage is the responsive and dynamic content that can aggregate content to show content based on context as well as being a medium for interaction and media files where the card itself can act as a window to interact and play media files such as audio and video to the user. An additional advantage is for call-to-actions (CTAs) that need specific attention from the user such as describing and propping up subscription information for a paid feature. This card may require the user to click and go to more descriptive information of the feature or subscribe to the feature itself. Another advantage of using cards is with varying screen sizes, where card content could be either increased or decreased based on screen size.

Aspects of the present disclosure are incorporated with well-articulated names for menus that describe the menus, submenus and cards items in the UI design. However, there are some limitations with card designs. One limitation is that fixed menus and submenus are static, can be too long for the display port, and are not customizable. Favorites are also fixed within the UI design. Another limitation is that several cards are provided in one page which requires the user to scroll through all cards every time to reach the card that may be at the bottom of the page. A further limitation is that there is no animation possibility as it is not customizable for each user and the amount of information could easily overwhelm the user if it is displayed for each and every visit to the pages.

This disclosure shows how the device will incorporate steps in a novel way so that the above limitations may be overcome while continuing to employ the menus, submenus and cards in the same level of richness and simplicity in the invention.

Consider for purposes of this discussion, that the user is accessing a menu through a client device. As will be discussed in greater detail below, the client device is able to generate GUI data, based on the menu data, for display as a GUI on the display device. The GUI menu displays a plurality of user-selectable menu items for the user. However, the client may not know how to get to certain user-selectable menu items, and with the many choices it may be difficult to navigate through the menu. This may be time-consuming for the client and could increase frustration when trying to operate the product.

FIG. 1 illustrates an example algorithm 100 to be executed by a processor for automatically rearranging user-selectable menu items on a GUI menu, in accordance with aspects of the present disclosure.

As shown in the figure, algorithm 100 starts (S102), and GUI data is generated (S104). For example, with the situation previously mentioned, the processor of the client device is configured to execute instructions stored on the memory to cause the client device to generate GUI data, based on the menu data, including user-selectable menu items such as add a new satellite, speed test history, settings, etc. When first presented, the menu is displayed in a predetermined order. However, as will be discussed in greater detail below, the menu data will be updated in response to the user's selections. Also, the menu is displayed in a new order based on the updated menu data.

Returning to FIG. 1, after GUI data is generated (S104), a user-selectable menu item selection is detected (S106).

Figure 2:
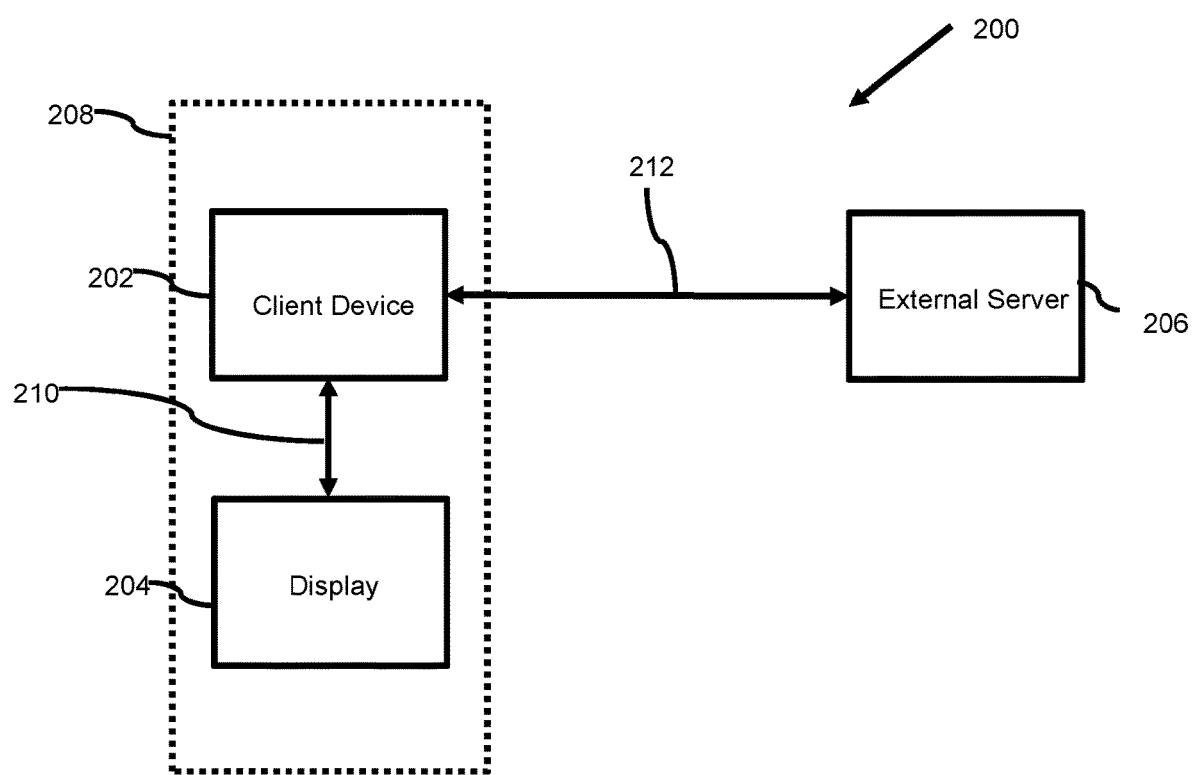
FIG. 2 illustrates a system for modifying a GUI, in accordance with aspects of the present disclosure.

FIG. 2 illustrates a system 200 for modifying a GUI, in accordance with aspects of the present disclosure.

As shown in the figure, system 200 includes a client device 202, a display 204, an external server 206, a communication channel 210, and a communication channel 212. In this embodiment, client device 202 and display device are illustrated as distinct devices. In some embodiments client device 202 and display device 204 may be implemented as a unitary device as illustrated by dotted box 208.

Client device 202 is configured to communicate with display 204 via communication channel 210. Client device 202 is additionally configured to communicate with external server 206 via communication channel 212.

Figure 3:
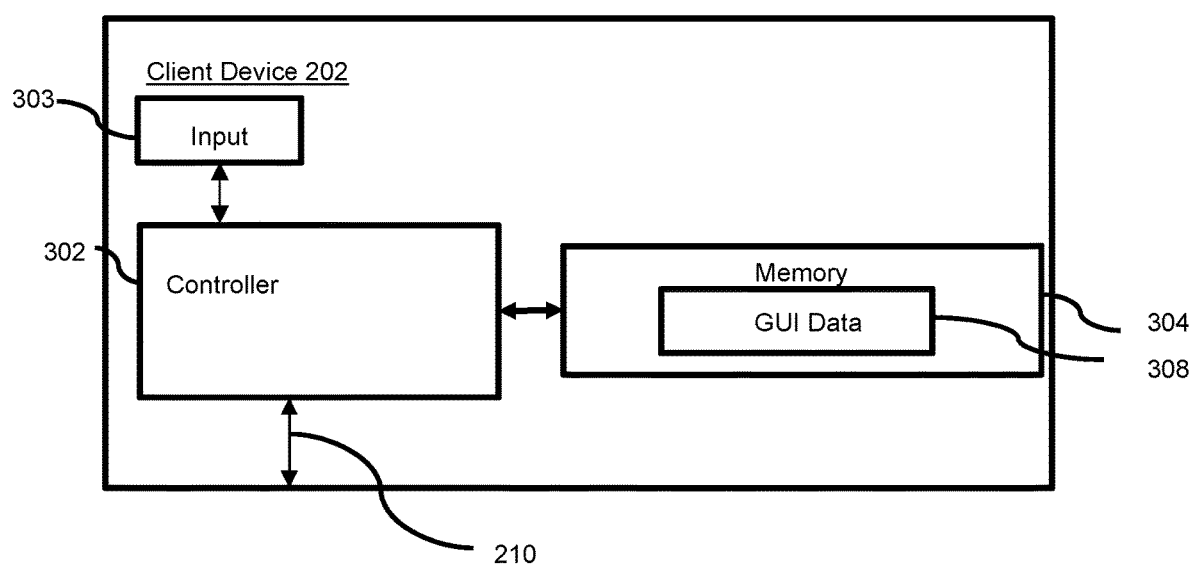
FIG. 3 illustrates an exploded view of the client device of FIG. 2.

FIG. 3 illustrates an exploded view of client device 202 of FIG. 2.

As shown in FIG. 3, client device 202 includes a controller 302, an input 303, memory 304, and communication channel 210. Memory 304 has GUI data 308 stored therein.

Controller 302 is configured to communicate with memory 304.

In this example, controller 302 and memory 304 are illustrated as individual devices. However, in some embodiments, controller 302 and memory 304 may be combined as a unitary device. Whether as individual devices or as combined devices, controller 302 and memory 304 may be implemented as any combination of an apparatus, a system, and an integrated circuit. Further, in some embodiments, at least one of controller 302 and memory 304 may be implemented as a computer having non-transitory computer-readable media for carrying or having computer-executable instructions or data structures thereon. Such non-transitory computer-readable recording medium refers to any computer program product, apparatus or device, such as a magnetic disk, optical disk, solid-state storage device, memory, programmable logic devices (PLDs), DRAM, RAM, ROM, EEPROM, CD-ROM or other optical disk storage, magnetic disk storage or other magnetic storage devices, or any other medium that can be used to carry or store desired computer-readable program code in the form of instructions or data structures and that can be accessed by a general-purpose or special-purpose computer, or a general-purpose or special-purpose processor. Disk or disc, as used herein, includes compact disc (CD), laser disc, optical disc, digital versatile disc (DVD), floppy disk and Blu-ray disc. Combinations of the above are also included within the scope of computer-readable media. For information transferred or provided over a network or another communications connection (either hardwired, wireless, or a combination of hardwired or wireless) to a computer, the computer may properly view the connection as a computer-readable medium. Thus, any such connection may be properly termed a computer-readable medium. Combinations of the above should also be included within the scope of computer-readable media.

Example tangible computer-readable media may be coupled to a processor such that the processor may read information from, and write information to the tangible computer-readable media. In the alternative, the tangible computer-readable media may be integral to the processor. The processor and the tangible computer-readable media may reside in an integrated circuit (IC), an application specific integrated circuit (ASIC), or large scale integrated circuit (LSI), system LSI, super LSI, or ultra LSI components that perform a part or all of the functions described herein. In the alternative, the processor and the tangible computer-readable media may reside as discrete components.

Example tangible computer-readable media may also be coupled to systems, non-limiting examples of which include a computer system/server, which is operational with numerous other general purpose or special purpose computing system environments or configurations. Examples of well-known computing systems, environments, and/or configurations that may be suitable for use with computer system/server include, but are not limited to, personal computer systems, server computer systems, thin clients, thick clients, handheld or laptop devices, multiprocessor systems, microprocessor-based systems, set-top boxes, programmable consumer electronics, network PCs, minicomputer systems, mainframe computer systems, and distributed cloud computing environments that include any of the above systems or devices, and the like.

Such a computer system/server may be described in the general context of computer system-executable instructions, such as program modules, being executed by a computer system. Generally, program modules may include routines, programs, objects, components, logic, data structures, and so on that perform particular tasks or implement particular abstract data types. Further, such a computer system/server may be practiced in distributed cloud computing environments where tasks are performed by remote processing devices that are linked through a communications network. In a distributed cloud computing environment, program modules may be located in both local and remote computer system storage media including memory storage devices.

Components of an example computer system/server may include, but are not limited to, one or more processors or processing units, a system memory, and a bus that couples various system components including the system memory to the processor.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

A program/utility, having a set (at least one) of program modules, may be stored in the memory by way of example, and not limitation, as well as an operating system, one or more application programs, other program modules, and program data. Each of the operating system, one or more application programs, other program modules, and program data or some combination thereof, may include an implementation of a networking environment. The program modules generally carry out the functions and/or methodologies of various embodiments of the application as described herein.

Controller 302 may be a hardware processor such as a microprocessor, a multi-core processor, a single core processor, a field programmable gate array (FPGA), a microcontroller, an application specific integrated circuit (ASIC), a digital signal processor (DSP), or other similar processing device capable of executing any type of instructions, algorithms, or software for controlling the operation and functions of client device 202 in accordance with the embodiments described in the present disclosure.

Memory 304 can store various programming, and user content, and data including GUI data 308. In some embodiments, as will be described in more detail below, memory 304 includes instructions to be executed by controller 302 to enable client device 202 to generate GUI data 308, based on the menu data, for display as a GUI on display 204. The GUI includes a plurality of user-selectable menu items configured in a first order. The menu data is updated in response to a selection, by the user, of one of the plurality of user-selectable menu items. GUI data 308 is updated for display as an updated GUI on display 204, wherein the menu data includes a plurality of menu item counters corresponding to the plurality of user-selectable menu items, respectively. The menu data is updated in response to the selection, by the user, of the one of the plurality of user-selectable menu items, so as to increase a menu item counter corresponding to the one of the plurality of user-selectable menu items. GUI data 308 is updated for display as the GUI is updated on display 204 by arranging the plurality of user-selectable menu items in a second order based on values of the menu item counter.

In some embodiments, as will be described in more detail below, memory 304 includes instructions to be executed by controller 302 to enable client device 202 to generate GUI data 308 such that the one of the plurality of user-selectable menu items includes a plurality of user-selectable submenu items configured in a first sub menu order. The menu data includes a plurality of submenu item counters corresponding to the plurality of user selectable submenu items, respectively. The menu data is updated in response to a selection, by the user, of one of the plurality of user-selectable submenu items, so as to increase a submenu item counter corresponding to the one of the plurality of user-selectable submenu items. GUI data 308 is updated for display as the updated GUI on display 204 by additionally arranging the plurality of user-selectable submenu items in a second submenu order based on values of the submenu item counter.

In some embodiments, as will be described in more detail below, memory 304 includes instructions to be executed by controller 302 to enable client device 202 to generate GUI data 308, based on the menu data, for display as a GUI menu selected from the group of types of GUI menus consisting of a card menu, a horizontal menu, a hamburger menu, a mega menu, a scroll triggered menu, a vertical slidebar menu, a hover trigger menu, a sticky menu and a fixed menu.

Controller 302 may interface with one or more layers including a human-machine interface (HMI) machines with physical input hardware such as keyboards, mice, game pads and output hardware such as computer monitors, speakers, and printers. Additional user interface (UI) layers may interact with one or more human senses, including tactile UI (touch), visual UI (sight), and auditory UI (sound). For example, the user may use client device 202 that has a touch display as a way of accessing their controller.

In further embodiments, with reference to FIG. 3, in the event that the display device is a secondary device and it is a user interface display device, for example a touch display, then the user selecting with touch display will go through communication channel 210 to controller 302.

Figure 4A:
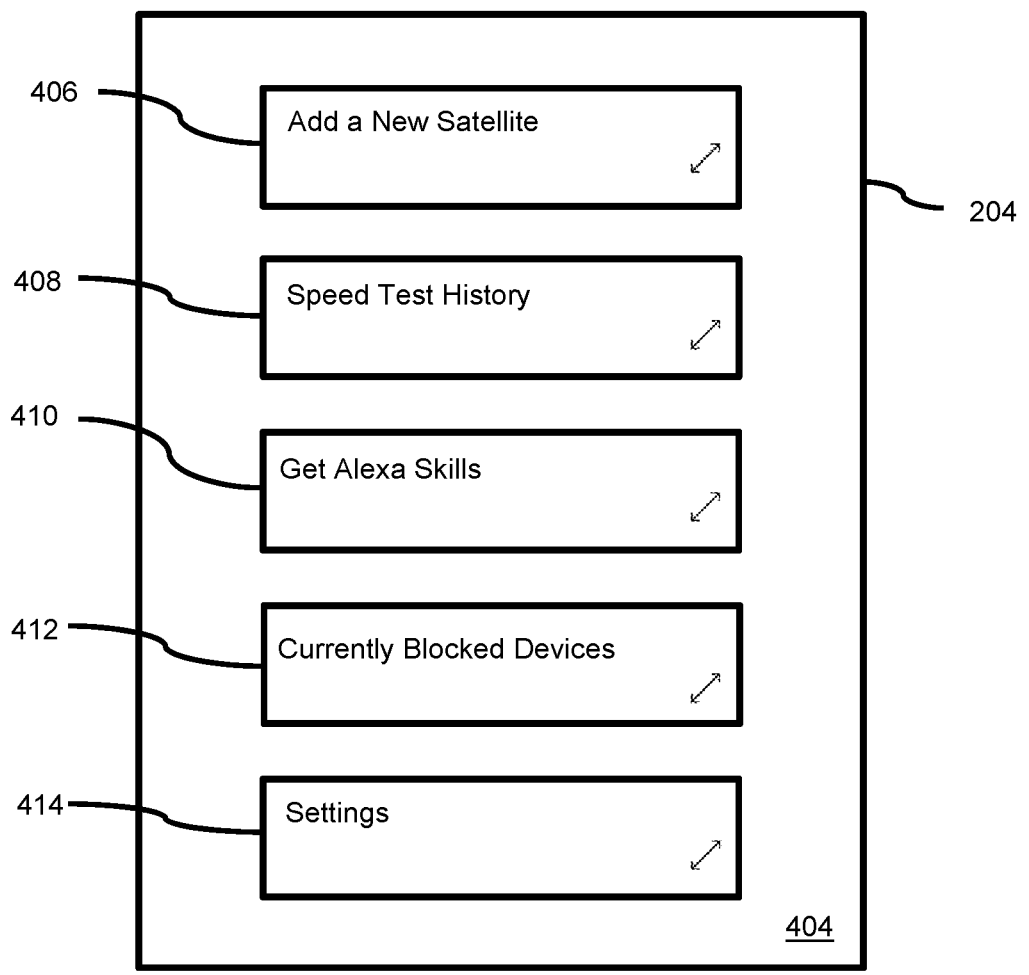
FIG. 4A illustrates a non-limiting example of a display displaying a GUI at time $t_0$, in accordance with aspects of the present disclosure.

FIG. 4A illustrates a non-limiting example of display 204 displaying a GUI 404 at time to, in accordance with aspects of the present disclosure.

As shown in in the figure, GUI 404 includes user-selectable menu items 406, 408, 410, 412, and 414.

With reference to FIG. 4A, the menu data is updated in response to a selection by the user within the data processing of the device. However, the user does not see this change immediately; they only perceive the updated version of the menu after a predetermined period of time.

For example, the user may choose the user-selectable menu item speed test history, which will open up a display with further information regarding speed test history. The GUI data for display will be updated after a predetermined time period, for example, a week, and will then present the user's most selected user-selectable menu items first.

In some embodiments, the GUI data for display may be updated in real time. The menu may also show some changes in font size or font color with addition to the order changes.

In an example embodiment, as shown in FIG. 2, the user may interact with a touch screen, in this example display 204, which instructs device 202 what was selected. More specifically, as shown in FIG. 4A, a user may select Get Alexa Skills 410. Additionally, as shown in FIG. 3, controller 302 would update GUI data 308 and memory 304 based on the selection by the user.

Returning to FIG. 1, after a user-selectable menu item selection is detected (S106), menu data is updated (S108).

FIG. 5A illustrates a non-limiting example of a lookup table (LUT) 500 at time to, in accordance with aspects of the present disclosure.

As shown in the figure, LUT 500 includes a menu item column 502, a counter column 504, a font size column 506, a font color column 508, a location column 510, a row 512, a row 514, a row 516, a row 518, and a row 520.

Data entries in menu item column 502 identify each user-selectable menu item shown in FIG. 4A, as a respective identifier. In this example, each identifier includes a four letter portion related to the title of the corresponding user-selectable menu item of FIG. 4A, a dash and an integer. In this example, the integer corresponds to the number of times each user-selectable menu item has been selected. For example, ANST-0 in row 512 identifies menu item 406 Add a New Satellite in FIG. 4A. At time $t_0$, no user-selectable menu items have been selected. As such, all the integers in the data entries of menu item column 502 are zero.

Counter column 504 identifies how many times each user-selectable menu item has been chosen, which in this example, at time $t_0$ indicates that no user-selectable menu item has been chosen. It should be noted that in some embodiments, either counter column 504 is not included or the integer in each data entry of menu item column 502 is not included.

Font size column 506 identifies the font size at which each user-selectable menu item will be presented. In this example, no items have been chosen causing the font size to remain at the standard, which in this example is 12 point font.

Font color column 508 identifies the font color given to each of the user-selectable menu items. Since none of the items have yet to be selected, the font color remains at the standard, which in this example is black.

Location column 510 identifies the location in which the user-selectable menu items will be presented to the user. In this example, the user-selectable menu items are presented in a single card column as shown in FIG. 4A. Accordingly, in column 510, all the user-selectable menu items are in indicated as being in the same horizontal plane as indicated by H1. Further, the user-selectable menu items are arranged in a predetermined default manner vertically as indicated by V1, V2, V3, etc. For example, column 510 row 512 shows the location of ANST-0 in FIG. 4A which can be seen as the first user-selectable menu item presented to the user, item 406 Add a New Satellite.

FIG. 5B illustrates LUT 500 of FIG. 5A at time $t_1$, in accordance with aspects of the present disclosure.

As the user makes selections, the data within the columns of LUT 500 will update accordingly. For example, consider the situation wherein as shown in FIG. 4A, user-selectable menu item 410 Get Alexa Skills has been selected once at time $t_1$. As shown in FIG. 5B, counter column 504 row 516 has been increased to 1. However, it should be noted that data within location column 510 of FIG. 5B has not yet changed as compared to FIG. 5A. This is because the predetermined period of time or number of times an item needs to be selected has yet to be reached at time $t_1$.

FIG. 5C illustrates LUT 500 of FIG. 5A at time $t_2$, in accordance with aspects of the present disclosure.

In this example, at time $t_2$, the predetermined period of time or number of times an item needs to be selected has been reached. As shown in the figure, counter column 504 row 520 shows that Settings, or SETT-8, has been selected 8 times as indicated by the 8 in the counter column as well as an 8 replacing a 0 in the menu item name.

Settings, or SETT-8, has been chosen the most, so in this non-limiting example embodiment font size column 506 row 520 shows the corresponding font change, which in this example is 13. The other less selected items were given smaller font sizes, as shown in column 506 with the number 11. By changing the font to be more pronounced over the other user-selectable menu items, the Settings user-selectable menu item will be more easily seen by the user.

Font color column 508 also indicates change in row 520, where the item chosen the most has the font color change to blue, as indicated in the row with the word "Blue". By changing the font to have a different color as compared with the other user-selectable menu items, the Settings user-selectable menu item will be more easily seen by the user.

Figure 4B:
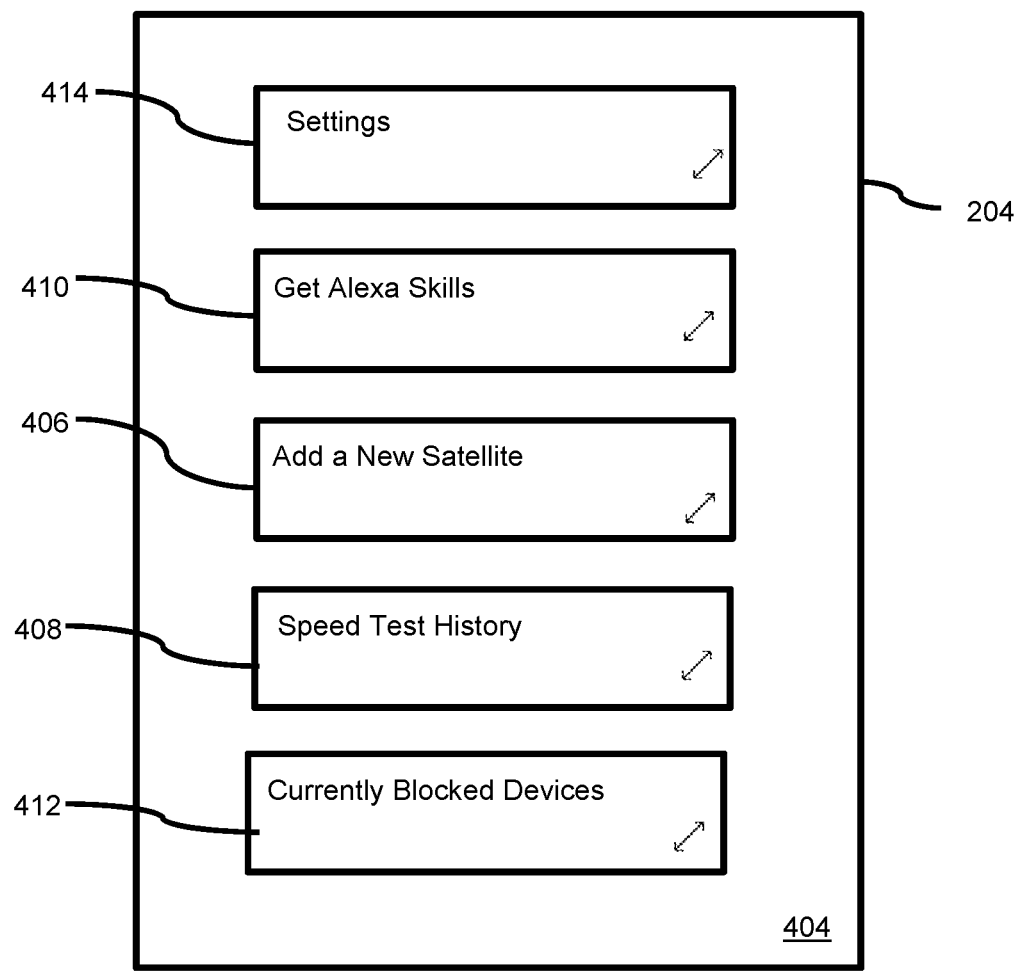
FIG. 4B illustrates a display displaying GUI at time $t_1$, in accordance with aspects of the present disclosure.

Lastly, location column 510 shows the changes made to the order of presentation to the user-selectable menu items based on the number of times chosen. While the orientation of the user-selectable items does not change horizontally in this example, they are rearranged vertically from the menu-selectable item chosen the most being presented at the top, with lesser chosen menu-selectable items descending down to where the menu-selectable item chosen the least being presented at the bottom. For example, SETT-0 was chosen the most, as indicated in counter column 504 row 520, so this item is given horizontal 1 vertical 1, as shown in the figure as "H1 V1". This order presentation change is shown in FIG. 4B with Settings 414 being shown at the top of the user's screen.

In an example embodiment, controller 302 of FIG. 3 rearranges the user-selectable menu items in real time. For example, as shown in FIG. 4A, consider the user selecting Get Alexa Skills 410. Each time the user selects this, GUI data 308 is updated in memory 304 of client device 202. This change is shown with row 516 in FIGS. 5A and 5B.

However, in some embodiments, controller 302 makes the changes after a predetermined time period. For example, controller 302 may rearrange user-selectable menu items based on the number of selection after a week.

Further, in some embodiments, controller 302 may rearrange user-selectable menu items based on a number of selections. For example, as shown in FIG. 5C, the user-selectable menu items may be rearranged after a user-selectable menu item, such as Get Alexa Skills 516, is chosen 5 times. Once the number of times has been reached, controller 302 rearranges the user-selectable menu items in accordance with those changes.

In an example embodiment, FIG. 4A shows display 204 before user interaction as well as FIG. 5A showing an example of a LUT showing user-selectable menu items before they are interacted with. If the user were to choose Get Alexa Skills 410, as shown in FIG. 4A, the counter column 504 of FIG. 5B would be updated based on the selection detection.

Returning to FIG. 1, after menu data is updated (S108), GUI data is updated (S110).

FIG. 4B illustrates display 204 displaying GUI 404 at time $t_1$, in accordance with aspects of the present disclosure.

For example, with reference to FIG. 5C, if the user were to choose Get Alexa Skills 5 times, Add a New Satellite 3 times, Currently Blocked Devices 0 times, Speed Test History 1 time, and Settings 8 times; then the user-selectable menu items would be presented as shown in FIG. 4B as: user-selectable menu item 414 titled Settings, user-selectable menu item 410 titled Get Alexa Skills, user-selectable menu item 406 titled Add a New Satellite, user-selectable menu item 408 titled Speed Test History, and user-selectable menu item 412 titled Currently Blocked Devices.

As mentioned previously, the user-selectable menu items are arranged based on the number of times they are selected as indicated by counter column 504. This then corresponds with their location as shown in location column 510, with the user-selectable menu items selected the most being the first item presented and with the user-selectable menu item selected the least being pushed to the bottom of the list. In this example, SETT-8, or user-selectable menu item 414 titled Settings as shown in FIG. 4B, was selected the most and is shown first due to the location column being H1 V1, this meaning a position of horizontal 1 and vertical 1. However, CBDV-0, or user-selectable menu item 412 titled Currently Blocked Devices as shown in FIG. 4B, was selected the least and is shown last due to the location column being H1 V5, meaning a position of horizontal 1 and vertical 5.

In some embodiments, user-selectable user-selectable menu items may be chosen the same number of times. In these instances, they may be further arranged in alphabetical order. For example, if the user-selectable menu items Currently Blocked Devices and Speed Test History were both chosen five times, Currently Blocked Devices would receive the H1 V1 location column spot while Speed Test History would receive the H1 V2 column spot.

Returning to FIG. 1, after GUI data is updated (S110), algorithm 100 stops (S112).

Figure 6A:
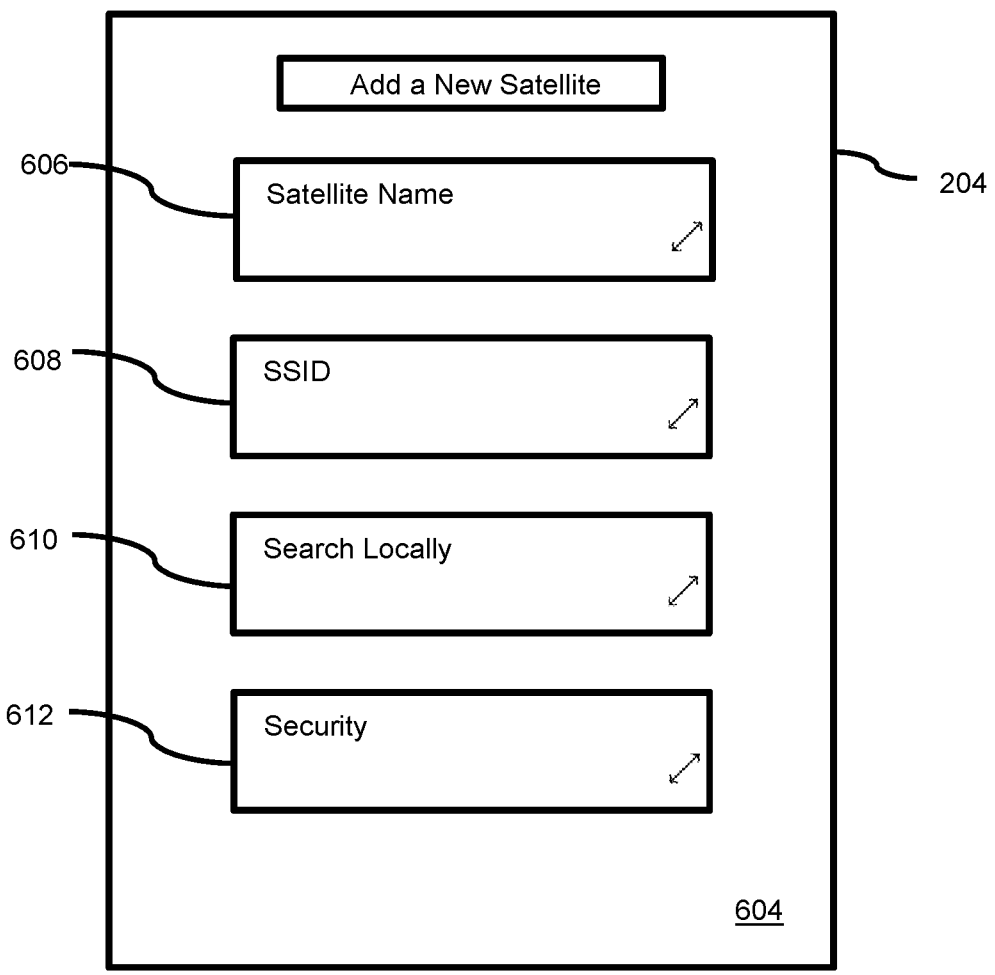
FIG. 6A illustrates a non-limiting example of a display displaying a GUI at time $t_3$, in accordance with aspects of the present disclosure.

FIG. 6A illustrates a non-limiting example of display 204 displaying a GUI 604 at time $t_3$, in accordance with aspects of the present disclosure.

As shown in the figure, GUI 604 includes user-selectable menu items 606, 608, 610, and 612.

In an example embodiment, as shown in FIG. 2, the user may interact with a touch screen, in this example, display 204, which instructs device 202 what was selected. More specifically, as shown in FIG. 4A, a user may select Add a New Satellite 406. This then presents menu with more information regarding adding a satellite such as Satellite Name 606, SSID 608, Search Locally 610, and Security 612. The user then has the option to select one of these user-selectable menu items to interact with. Additionally, as shown in FIG. 3, controller 302 would update GUI data 308 and memory 304 based on the selection by the user.

Figure 6B:
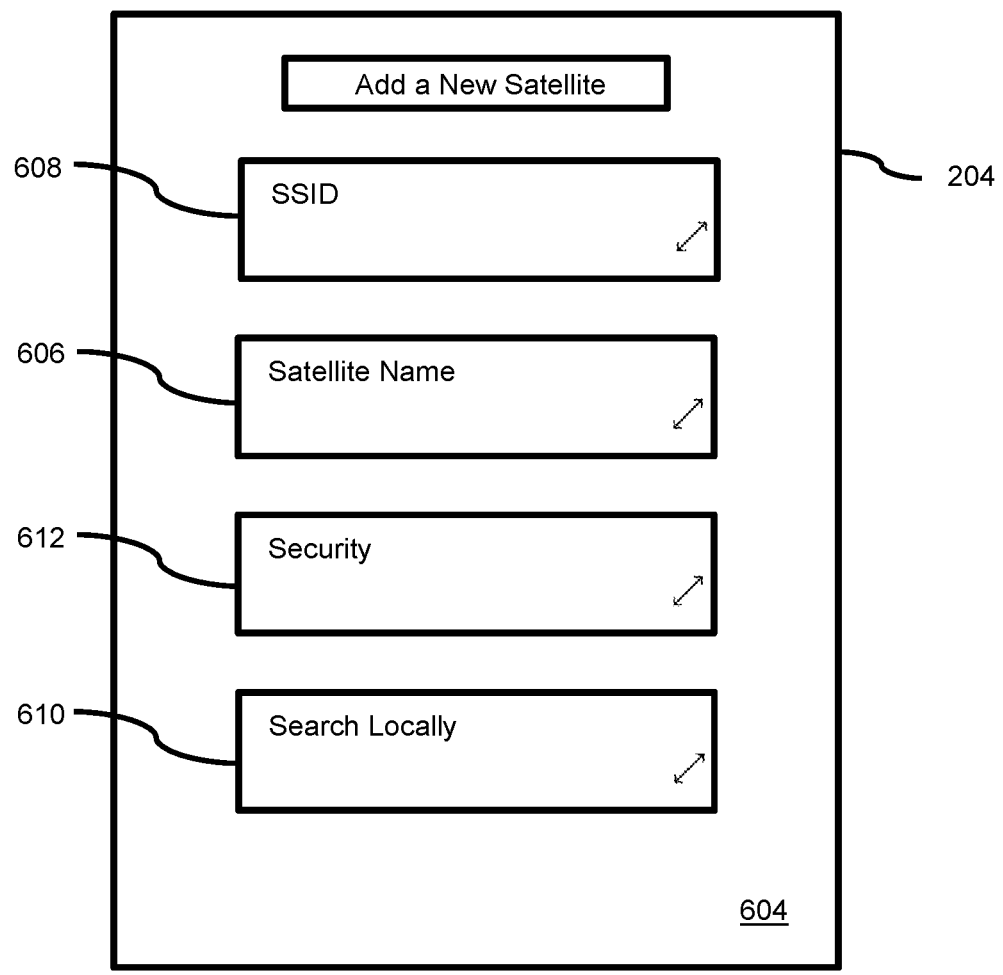
FIG. 6B illustrates a display displaying a GUI at time $t_4$, in accordance with aspects of the present disclosure.

FIG. 6B illustrates display 204 displaying GUI 604 at time $t_4$, in accordance with aspects of the present disclosure.

FIG. 7A illustrates a non-limiting example of a LUT 700 at time $t_3$ in accordance with aspects of the present disclosure.

As shown in the figure, LUT 700 includes a menu item column 702, a counter column 704, a font size column 706, a font color column 708, a location column 710, a row 712, a row 714, a row 716, and a row 718.

Data entries in menu item column 702 identify each user-selectable submenu item shown in FIG. 6A, as a respective identifier. In this example, each identifier includes a four letter portion related to the title of the corresponding user-selectable menu item for which the submenu item belongs, a first dash, a two letter portion related to the title of the corresponding user-selectable submenu item of FIG. 6A, a second dash, and an integer. In this example, the integer corresponds to the number of times each user-selectable submenu item has been selected. For example, ANST-SN-0 in row 712 identifies user-selectable submenu item 606 Satellite name in FIG. 6A.

Counter column 704 identifies how many times each user-selectable submenu item has been chosen. Counter column 704 is identifies that at time $t_3$ no user-selectable menu item has been chosen. Font size column 706 identifies the font size each user-selectable submenu item will be presented in. In this example, no items have been chosen causing the font size to remain at the standard, which in this example is 12 point font. Font color column 708 identifies the font color given to each of the user-selectable submenu items. Since none of the user-selectable submenu items have yet to be selected, the font color remains at the standard, which in this example is black. Location column 710 identifies the location in which the user-selectable submenu items will be presented to the user. In this example, none of the user-selectable submenu items have been selected so they are in the same horizontal plane as indicated by H1. The items are arranged in a predetermined default manner vertically as indicated by V1, V2, V3, etc. For example, column 710 row 712 shows the location of ANST-SN-0 in FIG. 6A which can be seen as the first user-selectable submenu item presented to the user, user-selectable submenu item 606 Satellite Name.

FIG. 7B illustrates LUT 700 of FIG. 7A at time $t_4$, in accordance with aspects of the present disclosure.

As the user makes selections, the columns will update accordingly. For example, as shown in FIG. 6A, user-selectable menu item 608 SSID has been selected once at time $t_4$, shown in FIG. 7B as the 1 in counter column 704 row 714. However, the location column has not yet changed, as shown in location column 710 row 714 being the same as in FIG. 7A. This is because the predetermined period of time or number of times a user-selectable submenu item needs to be selected has yet to be reached at time $t_3$.

FIG. 7C illustrates LUT 700 of FIG. 7A at time $t_5$ in accordance with aspects of the present disclosure.

In this example, at time $t_5$, the predetermined period of time or number of times a user-selectable submenu item needs to be selected has been reached. Counter column 704 identifies the number of times each user-selectable submenu item has been selected. For example, counter column 704 row 714 shows that SSID, or ANST-SD-4, has been selected 4 times by the 4 in the counter column as well as a 4 replacing a 0 in the menu item name. This user-selectable submenu item has been chosen the most, so font size column 706 row 714 shows the corresponding font change, which in this example is 13. The other less selected user-selectable submenu items were given smaller font sizes, as shown in column 706 with the number 11. Font color column 708 also indicates change in row 714, where the item chosen the most has the font color change to blue, as indicated in the row with the word "Blue". Lastly, location column 710 shows the changes made to the order of presentation to the user-selectable submenu items based on the number of times chosen. While the items orientation does not change horizontally in this example, they are arranged vertically from the user-selectable submenu item chosen the most being displayed at the top to the user-selectable submenu item chosen the least being displayed at the bottom. For example, ANST-SD-4 was chosen the most, as indicated in counter column 704 row 714, so this user-selectable submenu item is given horizontal 1 vertical 1, as shown in the figure as "H1 V1". This order presentation change is shown in FIG. 6B with submenu item SSID 608 being shown at the top of the display.

As discussed with reference to FIG. 5C, in the event of two user-selectable menu items (or submenu items) being chosen the same number of times, then such evenly selected user-selectable menu items (or submenu items) may then be organized in alphabetical order.

In an example embodiment, controller 302 of FIG. 3 rearranges the user-selectable menu items in real time. For example, as shown in FIG. 6A, consider the user selects SSID 608. Each time the user selects this, GUI data 308 is updated in memory 304 of client device 202. This change is shown with row 714 in FIGS. 7A and 7B.

In an example embodiment, FIG. 6A shows display 204 before user interaction as well as FIG. 7A showing an example of a LUT showing menu items before they are interacted with. If the user were to choose SSID 608, as shown in FIG. 6A, the counter column 704 of FIG. 7B would be updated based on the selection detection.

In an example embodiment, with reference to FIG. 7C, if the user were to choose Satellite Name 3 times, SSID 4 times, Search Locally 0 times, and Security 1 time, then the menu items would be presented as shown in FIG. 6B: SSID 608, Satellite Name 606, Security 612, and Search Locally 610.

In an example embodiment, the menu is drawn to a menu of the client device. The menu may be for another device that the client device is controlling. For example, if the client device is controlling an access point device (APD), gateway, or television, etc., then the menu associated with the operations of the device to be controlled will be presented to the user.

Further, in some embodiments, the client device in the above discussed non-limiting example may be any device that has a menu associated with it, non-limiting examples of which include Internet of Things (JOT) devices, or other devices such as an automobile having a GUI to control operations of the automobile.

Further, in some embodiments, the client device in the above discussed non-limiting example may provide to the user an ability to manage these UI menus, submenus and card rearrangement, if desired. For example, the client device may provide customization options in a separate UI page that may turn off customization. In other examples, the client device may provide customization options in a separate UI page that may customize menu, submenu and cards based on: a descending order; a most recently used shown on top; or alphabetically. In other examples, the client device may provide customization options in a separate UI page that may reset all customizations.

In this disclosure, a novel technique presents a UI design offered by menus, submenus and cards while also helping to customize the menus, submenus and cards in a way specific to that particular user. The disclosure is to keep different counters to track the usage of menus, submenus and cards in the client device. By gathering information in form of these counters, there are several advantages that the invention design can immediately reuse in the client device. The invention can choose to display the most commonly used items to a greater degree, e.g., by position, shape, size, etc., and display the least commonly used items to a lesser degree. This is a self-customization that is naturally occurring in the client device and is not random but customized for user and by the user themselves. Further, campaigns could be targeted and shown as special cards based on the most commonly preferred items by the user. Data collected in the device may easily be controlled as a global device setting to erase all customizations or restart fresh customizations or turn off customizations or as a local device setting to erase a specific menu customization or submenu customization or specific card customization. Information may also be included in the device analytics and stored in the device cloud for deep learning.

The operations disclosed herein may constitute algorithms that can be effected by software, applications (apps, or mobile apps), or computer programs. The software, applications, computer programs can be stored on a non-transitory computer-readable medium for causing a computer, such as the one or more processors, to execute the operations described herein and shown in the drawing figures.

The foregoing description of various preferred embodiments have been presented for purposes of illustration and description. It is not intended to be exhaustive or to limit the invention to the precise forms disclosed, and obviously many modifications and variations are possible in light of the above teaching. The example embodiments, as described above, were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. An electronic device for use with a display device and by a user, said electronic device comprising:
   a memory having menu data stored therein; and
   a processor configured to execute instructions stored on said memory to cause said electronic device to:
   generate graphic user interface (GUI) data, based on the menu data, for display as a GUI on the display device, the GUI including a plurality of user-selectable menu items configured in a first order;
   update the menu data in response to a selection, by the user, of one of the plurality of user-selectable menu items; and
   update the GUI data for display as an updated GUI on the display device based on the update to the menu data,
   wherein the menu data includes a plurality of menu item counters corresponding to the plurality of user-selectable menu items, respectively,
   wherein the user-selectable menu items are arranged on the updated GUI as indicated by plurality of menu item counters,
   wherein a location of each of the user-selectable menu items that indicates a position on the updated GUI of each of the user-selectable menu items is changed based on the plurality of menu item counters,
   wherein the menu data is updated in response to the selection, by the user, of the one of the plurality of user-selectable menu items, so as to increase a menu item counter corresponding to the one of the plurality of user-selectable menu items,
   wherein the updated GUI data is updated for display as the updated GUI on the display device by arranging the plurality of user-selectable menu items in a second order based on values of the menu item counter and after a predetermined time period, and wherein updating the GUI data comprises changing a font of at least one of the plurality of user-selectable menu items.

2. The electronic device of claim 1, wherein the processor is further configured to execute instructions stored on said memory to additionally cause said electronic device to:

generate the GUI data such that the one of the plurality of user-selectable menu items includes a plurality of user-selectable submenu items configured in a first submenu order, wherein the menu data includes a plurality of submenu item counters corresponding to the plurality of user-selectable submenu items, respectively, wherein the menu data is updated in response to a selection, by the user, of one of the plurality of user-selectable submenu items, so as to increase a submenu item counter corresponding to the one of the plurality of user-selectable submenu items, and wherein the updated GUI data is updated for display as the updated GUI on the display device by additionally arranging the plurality of user-selectable submenu items in a second submenu order based on values of the submenu item counter.

3. The electronic device of claim 1, wherein the processor is further configured to execute instructions stored on said memory to additionally cause said electronic device to generate the GUI data, based on the menu data, for display as a GUI menu selected from the group of types of GUI menus consisting of a card menu, a horizontal menu, a hamburger menu, a mega menu, a scroll triggered menu, a vertical slidebar menu, a hover trigger menu, a sticky menu and a fixed menu.

4. The electronic device of claim 1, wherein the menu data includes, for each of the plurality of user-selectable menu items, a respective plurality of data entries of a plurality of columns of a table, and wherein at least one of the respective data entries comprises a respective menu item counter of the plurality of menu item counters corresponding to a counter column of the plurality of columns.

5. The electronic device of claim 1, wherein the processor is further configured to execute instructions stored on said memory to additionally cause said electronic device to:

transmit the GUI data and the updated GUI data to an external server; and receive the GUI data and the updated GUI data from the external server.

6. A method of using an electronic device with a display device and by a user, said method comprising:

generating, via a processor configured to execute instructions stored on a memory additionally having menu data stored therein, graphic user interface (GUI) data, based on the menu data, for display as a GUI on the display device, the GUI including a plurality of user-selectable menu items configured in a first order;

updating, via the processor, the menu data in response to a selection, by the user, of one of the plurality of user-selectable menu items; and updating, via the processor, the GUI data for display as an updated GUI on the display device based on the update to the menu data, wherein the menu data includes a plurality of menu item counters corresponding to the plurality of user-selectable menu items, respectively, wherein the user-selectable menu items are arranged on the updated GUI as indicated by plurality of menu item counters, wherein a location of each of the user-selectable menu items that indicates a position on the updated GUI of each of the user-selectable menu items is changed based on the plurality of menu item counters, wherein the menu data is updated in response to the selection, by the user, of the one of the plurality of user-selectable menu items, so as to increase a menu item counter corresponding to the one of the plurality of user-selectable menu items, wherein the updated GUI data is updated for display as the updated GUI on the display device by arranging the plurality of user-selectable menu items in a second order based on values of the menu item counter and after a predetermined time period, and wherein updating the GUI data comprises changing a font of at least one of the plurality of user-selectable menu items.

7. The method of claim 6, further comprising:

generating, via the processor, the GUI data such that the one of the plurality of user-selectable menu items includes a plurality of user-selectable submenu items configured in a first submenu order, wherein the menu data includes a plurality of submenu item counters corresponding to the plurality of user-selectable submenu items, respectively, wherein the menu data is updated in response to a selection, by the user, of one of the plurality of user-selectable submenu items, so as to increase a submenu item counter corresponding to the one of the plurality of user-selectable submenu items, and wherein the updated GUI data is updated for display as the updated GUI on the display device by additionally arranging the plurality of user-selectable submenu items in a second submenu order based on values of the submenu item counter.

8. The method of claim 6, wherein said generating the GUI data, based on the menu data, for display as a GUI menu comprises generating the GUI menu selected from the group of types of GUI menus consisting of a card menu, horizontal menu, a hamburger menu, a mega menu, a scroll triggered menu, a vertical slidebar menu, a hover trigger menu, a sticky menu and a fixed menu.

9. The method of claim 6, wherein the menu data includes, for each of the plurality of user-selectable menu items, a respective plurality of data entries of a plurality of columns of a table, and wherein at least one of the respective data entries comprises a respective menu item counter of the plurality of menu item counters corresponding to a counter column of the plurality of columns.

10. The method of claim 6, further comprising:

transmitting, via the processor, the GUI data and the updated GUI data to an external server; and receiving, via the processor, the GUI data and the updated GUI data from the external server.

11. A non-transitory, computer-readable media having computer-readable instructions stored thereon, the computer-readable instructions being capable of being read by an electronic device for use with a display device and by a user, wherein the computer-readable instructions are capable of instructing the server device to perform the method comprising:

generating, via a processor configured to execute instructions stored on a memory additionally having menu data stored therein, graphic user interface (GUI) data, based on the menu data, for display as a GUI on the display device, the GUI including a plurality of user-selectable menu items configured in a first order;

updating, via the processor, the menu data in response to a selection, by the user, of one of the plurality of user-selectable menu items; and updating, via the processor, the GUI data for display as an updated GUI on the display device based on the update to the menu data, wherein the menu data includes a plurality of menu item counters corresponding to the plurality of user-selectable menu items, respectively, wherein the user-selectable menu items are arranged on the updated GUI as indicated by plurality of menu item counters, wherein a location of each of the user-selectable menu items that indicates a position on the updated GUI of each of the user-selectable menu items is changed based on the plurality of menu item counters, wherein the menu data is updated in response to the selection, by the user, of the one of the plurality of user-selectable menu items, so as to increase a menu item counter corresponding to the one of the plurality of user-selectable menu items, wherein the updated GUI data is updated for display as the updated GUI on the display device by arranging the plurality of user-selectable menu items in a second order based on values of the menu item counter and after a predetermined time period, and wherein updating the GUI data comprises changing a font of at least one of the plurality of user-selectable menu items.

12. The non-transitory, computer-readable media of claim 11, wherein the computer-readable instructions are capable of instructing the electronic device to perform the method further comprising:

generating, via the processor, the GUI data such that the one of the plurality of user-selectable menu items includes a plurality of user-selectable submenu items configured in a first submenu order, wherein the menu data includes a plurality of submenu item counters corresponding to the plurality of user-selectable submenu items, respectively, wherein the menu data is updated in response to a selection, by the user, of one of the plurality of user-selectable submenu items, so as to increase a submenu item counter corresponding to the one of the plurality of user-selectable submenu items, and wherein the updated GUI data is updated for display as the updated GUI on the display device by additionally arranging the plurality of user-selectable submenu items in a second submenu order based on values of the submenu item counter.

13. The non-transitory, computer-readable media of claim 11, wherein the computer-readable instructions are capable of instructing the server device to perform the method wherein said generating the GUI data, based on the menu data, for display as a GUI menu comprises generating the GUI menu selected from the group of types of GUI menus consisting of a card menu, a horizontal menu, a hamburger menu, a mega menu, a scroll triggered menu, a vertical slidebar menu, a hover trigger menu, a sticky menu and a fixed menu.

14. The non-transitory, computer-readable media of claim 11, wherein the computer-readable instructions are capable of instructing the electronic device to perform the method wherein the menu data includes, for each of the plurality of user-selectable menu items, a respective plurality of data entries of a plurality of columns of a table, and wherein at least one of the respective data entries comprises a respective menu item counter of the plurality of menu item counters corresponding to a counter column of the plurality of columns.

15. The non-transitory, computer-readable media of claim 11, wherein the computer-readable instructions are capable of instructing the electronic device to perform the method further comprising:

transmitting, via the processor, the GUI data and the updated GUI data to an external server; and receiving, via the processor, the GUI data and the updated GUI data from the external server.

* * * * *